US008958419B2

(12) United States Patent
Cummings et al.

(10) Patent No.: US 8,958,419 B2
(45) Date of Patent: Feb. 17, 2015

(54) SWITCH FABRIC PRIMITIVES

(75) Inventors: Uri Cummings, Santa Monica, CA (US); Zhi-Hern Loh, Pasadena, CA (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 12/483,662

(22) Filed: Jun. 12, 2009

(65) Prior Publication Data

US 2009/0310616 A1 Dec. 17, 2009

Related U.S. Application Data

(60) Provisional application No. 61/061,879, filed on Jun. 16, 2008.

(51) Int. Cl.
| | |
|---|---|
| *H04L 12/50* | (2006.01) |
| *H04Q 11/00* | (2006.01) |
| *H04L 12/28* | (2006.01) |
| *H04L 12/56* | (2006.01) |
| *H04L 12/937* | (2013.01) |
| *H04L 12/933* | (2013.01) |

(52) U.S. Cl.
CPC ............ *H04L 49/254* (2013.01); *H04L 49/109* (2013.01)
USPC .............................. 370/360; 370/390; 370/401

(58) Field of Classification Search
CPC .............................. H04L 67/1095; H04L 12/56
USPC .................................. 370/359, 401, 360, 390
See application file for complete search history.

(56) References Cited

U.S. PATENT DOCUMENTS

| 7,162,476 | B1* | 1/2007 | Belair et al. ........................ 1/1 |
|---|---|---|---|
| 7,567,560 | B1* | 7/2009 | Balasubramaniyan ....... 370/389 |
| 7,606,241 | B1* | 10/2009 | Raghunathan et al. ....... 370/400 |
| 7,849,503 | B2* | 12/2010 | Sanchez et al. ................. 726/13 |
| 8,040,902 | B1* | 10/2011 | Raghunathan et al. ....... 370/400 |
| 8,102,855 | B2* | 1/2012 | Goodman et al. ............ 370/392 |
| 2002/0010735 | A1* | 1/2002 | McMillen et al. ............ 709/201 |
| 2006/0002292 | A1* | 1/2006 | Chang et al. .................. 370/225 |
| 2006/0036769 | A1* | 2/2006 | Frey et al. ..................... 709/248 |
| 2006/0187958 | A1* | 8/2006 | Clark et al. ................... 370/468 |

(Continued)

OTHER PUBLICATIONS

J. Postel, RFC 792—Internet Control Message Protocol—DARPA Internet Program Protocol Specification, Sep. 1981, http://tools.ietf.org/html/rfc792 (22 pages).

*Primary Examiner* — Ayaz Sheikh
*Assistant Examiner* — Hoang-Chuong Vu
(74) *Attorney, Agent, or Firm* — Blakely, Sokoloff, Taylor & Zafman LLP

(57) ABSTRACT

Techniques are described for optimizing broadcast and collect primitives in switch fabrics. A switch is described for use in a switch fabric that includes a plurality of switches configured to interconnect a plurality of host devices. The switch includes a plurality of ports configured to receive and transmit data, and switch logic configured to facilitate transfer of the data among the ports. The switch logic is configured to implement a collect function in which responses from multiple destination host devices are collected and aggregated for transmission to a source host device. A first portion of the switch logic is configured to identify, count, and discard the responses in a data plane of the switch. A second portion of the switch logic is configured to generate an aggregated response in a control plane of the switch and introduce the aggregated response into the data plane for transmission toward the source host device.

9 Claims, 5 Drawing Sheets

(56) References Cited

U.S. PATENT DOCUMENTS

| | | | |
|---|---|---|---|
| 2007/0002770 A1* | 1/2007 | Haalen et al. | 370/256 |
| 2007/0297406 A1* | 12/2007 | Rooholamini | 370/390 |
| 2008/0141343 A1* | 6/2008 | Kumar et al. | 726/3 |
| 2009/0292734 A1* | 11/2009 | Miloushev et al. | 707/104.1 |
| 2009/0300419 A1* | 12/2009 | Silverman et al. | 714/30 |
| 2011/0083000 A1* | 4/2011 | Rhoades et al. | 712/22 |
| 2014/0013158 A1* | 1/2014 | Silverman et al. | 714/30 |

* cited by examiner

SWITCH FABRIC PRIMITIVES

RELATED APPLICATION DATA

The present application claims priority under 35 U.S.C. 119(e) to U.S. Provisional Patent Application No. 61/061,879 for SWITCH FABRIC PRIMITIVES filed on Jun. 16, 2008, the entire disclosure of which is incorporated herein by reference for all purposes.

BACKGROUND OF THE INVENTION

The present invention relates to techniques for optimizing the performance of switch fabrics.

The performance of clusters of devices interconnected by a switch fabric (e.g., 10 Gibabit Ethernet clusters) is based on applications, libraries, processors, remote direct memory access (RDMA) interconnect, and fabric primitives. Of these, fabric primitives are the least optimized critical function in multi-core, 10 Gigabit Ethernet clusters. Fabric primitives are point-to-multipoint, and multipoint-to-point services used to coordinate parallel processing. While a tremendous amount of work has been invested into the development of parallel applications and libraries, multi-core processors, and RDMA interconnects, the acceleration of fabric primitives has been neglected by most new fabric technologies.

SUMMARY OF THE INVENTION

According to various embodiments of the present invention, a switch is provided for use in a switch fabric including a plurality of switches configured to interconnect a plurality of host devices. The switch has a plurality of ports configured to receive and transmit data, and control logic configured to facilitate transfer of the data among the ports. The control logic is further configured to implement a collect function in which responses from multiple destination host devices are collected for transmission to a source host device. The control logic is configured to implement the collect function by waiting for and aggregating at least some of the responses from a subset of the multiple destination host devices into a single aggregated response. A first portion of the control logic is configured to identify, count, and discard the responses in a data plane of the switch. A second portion of the control logic is configured to generate the aggregated response in a control plane of the switch.

A further understanding of the nature and advantages of the present invention may be realized by reference to the remaining portions of the specification and the drawings.

DETAILED DESCRIPTION OF SPECIFIC EMBODIMENTS

Figure 1:
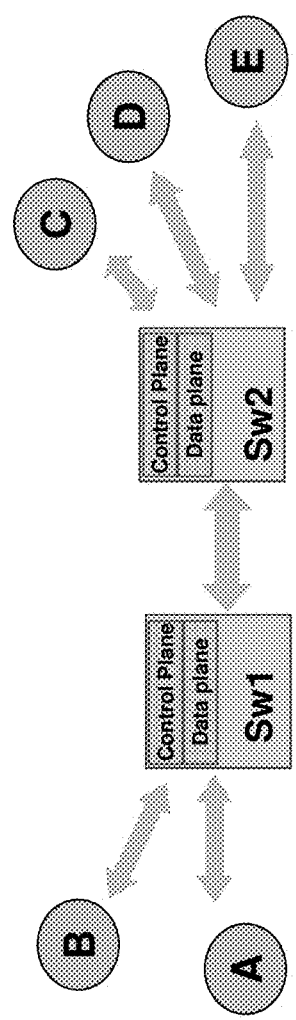
FIGS. 1-3 illustrate operation of Broadcast and Collect fabric primitives according to a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to various embodiments, the present invention provides techniques for accelerating fabric primitives in the context of a cluster.

Fabric primitives are based on broadcast (point-to-multipoint) and collect (multipoint-to-point) operations. These operations are inefficient when performed serially, and it is therefore desirable to perform them in parallel. Broadcast is the act of sending a message from a single source to multiple listeners on a group. A broadcast message may contain a large data segment or be nothing more than a synchronization. Broadcast is replication, and doesn't involve any further processing of information. It may be done, for example, with a group address.

Collect is like running a broadcast operation in reverse, and is often a response to a broadcast. The collect operation aggregates information. A collect operation may be configured to aggregate information at each switch hop. The simplest form of this is a true/false result of a function call. At each switch hop, a logical AND operation of the results is performed and the resulting message is sent up the broadcast tree.

Ethernet, the dominant TOP500 interconnect, has a natural head-start to optimizing broadcast & collect. The traditional Ethernet discipline lends itself well to broadcast applications. Fundamentally this comes from the nature of Ethernet switching. That is, before an Ethernet network has learned the MAC stations it "floods," i.e., it sends packets of unknown destination to all possible legal paths in the network. Once a node has learned the MAC address, it prunes the forwarding information database (FID) of all incorrect possible destinations. Because of this mode of operation, Ethernet switching technologies have been highly optimized for broadcast.

And perhaps as a result of this, most volume Ethernet switches are based on shared memories. Shared memory switches have the unique property that a broadcast/multicast packet only resides in one memory location, and can potentially be copied to all switch output locations in a parallel with modest jitter. The FM4224 Ethernet switch chip from Fulcrum Microsystems of Calabasas, Calif., extends the state of the art by achieving a fully provisioned broadcast from 1 to 23 ports in a 24 port switch with less than 67 nS of jitter. It should be noted, however, that embodiments of the present invention are not limited to switching systems that employ shared memory switches, and that the basic concepts described herein are more generally applicable.

Additionally, there is a prominence of multicast solutions in the standard developed by the Internet Engineering Task Force (IETF), e.g., IGMPv1, v2, v3, DVMRP, PIM-SM, PIM-DM, and many others. These protocols are used for applications as diverse as video distribution and market trading.

While collect operations have had no special significance in the tradition of Ethernet, there is a closely related, and vastly disseminated, function that may be used in accordance with specific embodiments of the invention for the primary acceleration of collect operations. Access Control Lists (ACLs) are most commonly implemented with TCAMs (Ternary Content Addressable Memories) which provide the ability to do an arbitrary N-tuple lookup, and then make switching, filtering, and counting decisions based on the result. According to a particular class of embodiments of the present invention, this basic capability in Ethernet networks may be used to implement a collect operation. Furthermore, while TCAMs structures typically add significant latency to the switching function, it is important to notice that the FM4224 chip referenced above can access all of it's internal TCAM resources and still maintain a per hop switching latency of 300 nS.

Embodiments of the invention optimize collect primitives in Ethernet fabrics. According to a specific implementation, such a fabric is built using Fulcrum's FM4224. In addition, as will become apparent, embodiments of the invention are predicated on the desire to stay interoperable with host network interface cards (NICs). However, and again, it should be noted that these particular technologies only represent specific embodiments of the invention, and that the basic techniques of the present invention are much more widely applicable.

An important metric for a fabric primitive is the overall latency to conclude the operation. Latency determines the granularity with which fabric synchronization can occur. Another important metric is NIC/Host offload. The NIC or potentially the host, may have significant limits to their ability to process multiple packets. Additionally they may contribute significant added jitter in the calculation. It is desirable to define the simplest involvement on the part of the NIC, and then measure NICs by their ability to participate quickly in this limited involvement model.

Interoperability is one of the great traditions in Ethernet networks. Ethernet components are interoperable in the switches from different vendors based on the same silicon, switches from different vendors based on different silicon, and switches and NICs from different vendors. Even if low latency Ethernet switching is only embraced by one vendor in the marketplace, there is significant value in supporting interoperability with different NIC vendors. At one point in the mid-2000s there were 17 different NIC projects underway. There are also at least 4 vendors of embedded CPUs with integrated NIC functionality. Clearly broadcast and collect functions that interoperates with all NICs and all NIC-substitute technologies preserves the market value of interoperability.

Since point-to-point protocol offload such as RDMA is fundamentally a NIC specific function, It makes sense to define a transparent broadcast & collect interface to RDMA.

Examples of the operation of fabric primitives implemented in accordance with embodiments of the present invention will now be described. In particular, a collect primitive is described below that take advantage of commonly existing switch structures to implement the collect function in the switch fabric rather than at the edges of the fabrics, i.e., rather than in the interconnected hosts. Generally, a collect primitive implemented in accordance with the invention is operable at each switch to identify in-band responses, extract them, manipulate or process them in some way, and then introduce a corresponding aggregated response back into the data plane without changing the order of the corresponding flow.

According to a particular class of embodiments, the functionality embodied by the collect primitive has components in both the data plane and the control plane. In the data plane, packets coming through a switch are scanned to identify responses corresponding to a particular collect primitive instance, and the nature of each response (e.g., "true" or "false"). The data plane functionality also includes counting the responses, as well as discarding the response packets (in favor of an aggregated response packet generated in the control plane as discussed below).

For example, if a switch is expecting responses from N nodes, the data plane logic will generate an event, e.g., an interrupt, to the control plane logic after all N responses have been received. At this point, the data plane logic (e.g., the counter(s)) would be reset. Alternatively, if, for example, the responses are either "true" or "false," and a single "false" response will be dispositive of the test being conducted by the host to which the responses are directed, the event or interrupt to the control plane might be generated upon receipt of the first "false" response. In such a case, the identification, counting, and discarding of subsequently received responses may still occur so that the logic will be reset when all expected responses have been received.

More generally, the data plane logic (which might be implemented using a TCAM as described elsewhere herein), implements one or more pattern matching functions, and a counter for each pattern. When any one of the counters reaches a threshold (e.g., from 1 (for the false result in the example above) up to N (e.g., the number of expected responses)), the event or interrupt to the control plane is generated. In addition, once the sum of the counter(s) reaches the number of expected responses (e.g., N), the counter(s) is/are reset, the control plane generates an aggregated response packet, and facilitates transmission of the aggregated response to the source. According to various embodiments, multiple, independent collect functions may overlap in time using, for example, an identifier in packet headers to indicate the collect primitive instance to which a particular response packet belongs.

The control plane logic operates as a control plane accelerator, responding to the events or interrupts from the data plane by formulating the aggregated response packet, and introducing the aggregated response packet back into the data plane directed to the appropriate switch egress port with reference to the multicast distribution tree, i.e., back up the tree to the source.

Assume that a first host device, e.g., a network interface card (NIC) in a server, on a switch fabric broadcasts the message "Test Function X on global variable 0 and return result" to all other hosts on the fabric. Conventionally, the results are aggregated serially by the host which broadcasts the original message. This results in a significant amount of traffic in the fabric, i.e., a response packet from every host which, particularly for "true" or "false" responses, may be unnecessarily redundant. In addition, if there are a great many responding hosts, a significant processing burden is placed on the first host to process all of the responses. Moreover, all of the responses need to be carried by the single connection from the first host to the fabric resulting in a bottleneck.

Therefore, according to a particular class of embodiments, a collect primitive is implemented in the switches in the fabric by which response packets may be filtered and their responses aggregated, and transmitted as a single result package. An example of such a collect primitive might be a simple "AND" function which logically combines the results from all connected hosts. According to some embodiments, complementary broadcast and collect primitives implemented in fabric switches may be run in sequence to effect compute functions in the fabric. More generally, the present invention enables primitives which operate in switch fabrics and which implement "fabric-centric" functions and services which need not be constrained to any particular application-specific interconnect technology.

According to a specific embodiment, the control plane components of such primitives are implemented in a field programmable gate array (FPGA) in the switch which operates as a control plane accelerator, i.e., an agent in the control plane which is the "master" of the operation of these primitives. This results in a significant performance advantage in that the control plane is not directly involved in the line-rate data plane activity. That is, to initiate a broadcast from a particular switch, a broadcast instruction message is transmitted from the control plane to the shared memory switch chip. However, downstream switches do not need to repeat this interaction between the control plane and the data plane.

When responses to the broadcast message (e.g., "true" or "false") are returned, the collect primitive is configured to aggregate the responses at line rate data plane using, for example, the TCAM and available counter resources. The control plane agent then intervenes to facilitate transmission of the aggregated response back to the source of the broadcast and to reset the counters.

According to some embodiments, each time a packet is received which maps to an existing collect primitive (e.g., an ACL), an interrupt to the control agent, e.g., the FPGA, is generated, and the control agent then polls the counters associated with the ACLs to determine whether the aggregated result packet may be generated and sent out. In the example of "true" and "false" responses, this may be when the counters indicate that all hosts in the group have reported "true" or, alternatively, when at least one "false" has been reported.

Examples of the operation of fabric primitives (also referred to herein as fabric services) in the context of an Ethernet fabric will now be described with reference to the accompanying drawings. FIG. 1 shows hosts A-E that are the five members of a Group N (Gn) connected by a fabric including two switches sw1 and sw2. Hosts A-E may refer to any kind of computing device or portion thereof which may be interconnected with a switch fabric. As mentioned above, and according to a specific embodiment of the invention, switches sw1 and sw2 may be implemented using the FM4224 chip from Fulcrum Microsystems. However, it should be noted that other switches may be enhanced in accordance with the invention. It should also be noted that the two-switch topology is merely a simple example provided for illustrative purposes, and that embodiments of the invention are contemplated for a wide variety of switch fabric topologies in which address learning/enumeration can be established and that are loop free.

Figure 2:
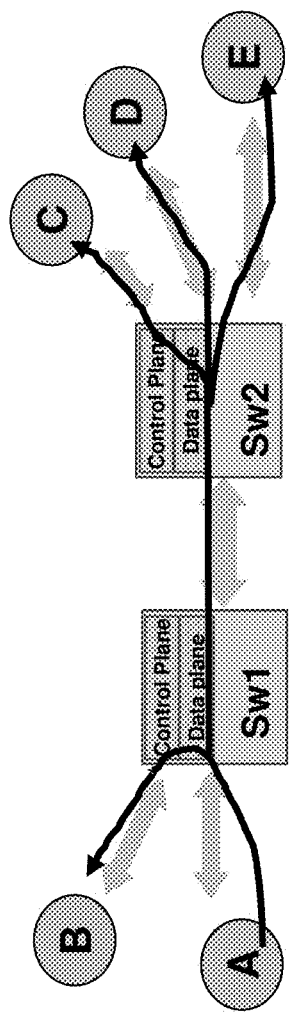

As shown in FIG. 2, Host A initiates a broadcast directed to all of the other hosts in the group using a multicast message to a group address. The broadcast is relatively straightforward and may be effected with minimal processing (e.g., packet replication) in the switch fabric itself. In this example, the broadcast message requests that each receiving host perform some function (e.g., compare) on a global variable and return a result. According to a particular class of embodiments, these results are mapped into the packet header of the response packets generated by each host.

Figure 3:
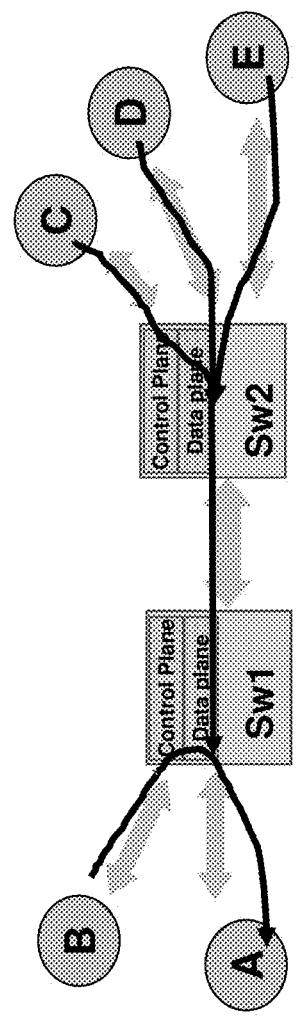

In the Ethernet context, there exists a set of data plane hooks that are leveraged to implement a collect function in accordance with embodiments of the invention that aggregates results with reference to these augmented packet headers. So, for example, assume that the collect function implements an AND function on the returned results which may be either "true" or "false." Switch sw2 sent the original broadcast message to 3 members of the group (hosts C, D, and E) and is therefore waiting for 3 responses which it tracks through the use of counters. When all responses are received and the response packets discarded, the results may be logically combined, e.g., ANDed together, and the aggregated result mapped to a packet header which is then transmitted to sw1 as shown in FIG. 3. As an optimization, where the aggregation is an AND function, the single response packet may be sent to sw1 upon receipt of the first "false" result rather than waiting for all results to come in. Moreover, the single response packet could simply be the passed through "false" result packet rather than a new packet.

It should be noted that the aggregation of "true" and "false" results is only one example of a relatively simple way in which results may be combined, and that embodiments of the present invention are contemplated that involved more sophisticated result aggregation which may, in turn, involve greater control plane interaction. That is, for simple cases like true/false aggregation, the aggregation may be performed entirely or largely in the data plane. By contrast, more complex aggregations may be performed in part, or entirely, in the control plane. For example, a combination could require that the received results be added together as they progress through the fabric toward the final host destination. Many other aggregations or combinations will be apparent to those of skill in the art.

Switch sw1 then aggregates the single result packet from sw2 with the result from host B in a similar manner. In this way, host A receives a single result packet which aggregates the results from hosts B-E.

According to a specific implementation of the Broadcast and Collect protocol described above, the ternary content addressable memory (TCAM) in each switch is used to match the returned responses to the original broadcast message. That is, TCAM-based access control lists (ACLs) effectively implement an n-tuple look up that matches the broadcast control group, the source address, and possibly a sequence number (see below) to a particular ACL. The control plane logic resets the ACLs after forwarding the aggregated responses.

According to some embodiments, throughput may be enhanced through the use of pipelining by which each broadcast message for which responses are to be aggregated has an associated sequence number, and each switch in the fabric would maintain separate TCAM entries for the different sequence numbers. As a result, one broadcast and collect would not need to be completed before initiating another. According to some embodiments, aggregated responses may be directed to another host on the fabric instead of or in addition to the host which initiated the broadcast.

According to some embodiments, message priority is used to keep broadcast and collect primitive signals separate from ordinary traffic queues. According to such implementations, a signal message that is completing a data distribution must be in the same priority to guarantee order preservation. According to one implementation in which there are eight priorities (Pri 0-7), fabric management signals are assigned the highest priority, i.e., Pri 7. Broadcast and collect primitive signals are assigned the next highest priority, i.e., Pri 6. Bulk broadcasts are assigned to Pri 5, with all other traffic assigned to Pri 0-4.

Figure 4:
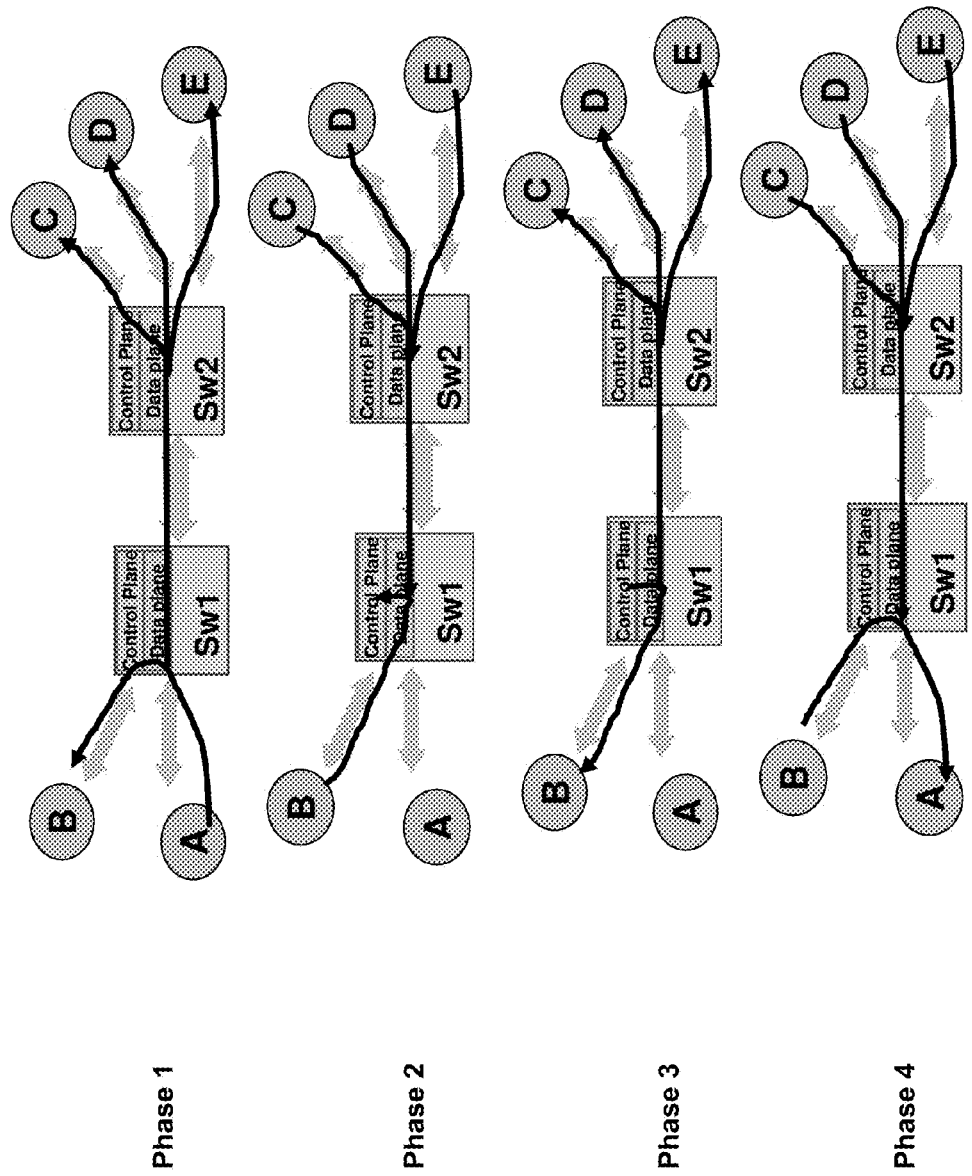
FIG. 4 illustrates operation of a Test and Set fabric primitive according to a specific embodiment of the invention.

Another example of a fabric primitive, i.e., a Test and Set service, shown in FIG. 4, offloads a significant computing burden from the host from which the original message originates; in this case host A. In Phase 1, host A initiates a broadcast (or multicast) message requesting that each host in the group test global variable V1. In Phase 2, the responses from the other hosts in the group are aggregated in switches sw1 and sw2 as described above, except that the aggregated responses are not yet communicated to host A. Instead, the control plane in sw1, i.e., the leaf node of the switch fabric to which host A is connected, collects the responses for V1 and, in Phase 3 initiates a second broadcast instructing each of the hosts in the group (with the exception of host A) to set variable V2.

In Phase 4, the set V2 completion responses from hosts B-E are again aggregated in sw1 and sw2, with the final result being communicated back to host A. In this way, each host, including the initiating host A, has only two interactions with the switch fabric.

Figure 5:
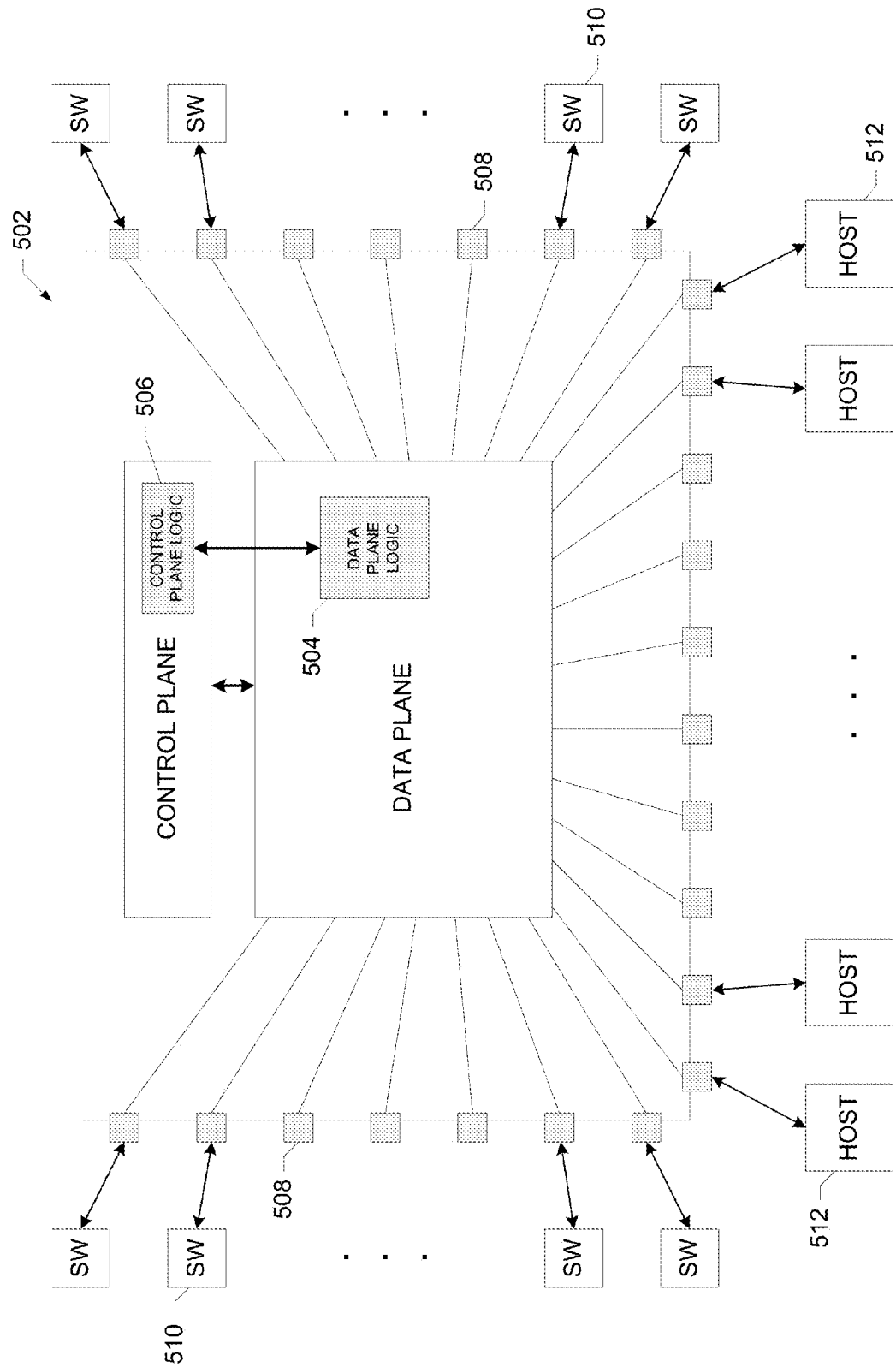
FIG. 5 is a simplified block diagram of a switch according to a specific embodiment of the invention.

FIG. 5 shows a simple block diagram of a switch 502 (which may comprise multiple switch chips) configured to implement a collect primitive in accordance with various specific embodiments of the invention. The switch (which may include one or more switch chips) includes data plane logic 504 (operating in the data plane of the switch) that includes response pattern matching rules (e.g., implemented using some kind of lookup table, e.g., a TCAM), and statistics monitoring (e.g., one or more counters), that allow identification, counting, and discarding of response packets at frame rate. According to various implementations, data plane logic 504 may be implemented using existing switch resources, an FPGA, a PLD, an ASIC, a microcontroller or CPU, etc. The manner by which packets are transferred among the various switch ports 508 via the data plane may vary considerably and still be within the scope of the invention. Those of skill in the art would appreciate that such data transfer may be effected via queues, shared memory, etc.

Switch 502 also includes control plane logic 506 (operating in the control plane of the switch) that is configured to respond to events or interrupts from the data plane logic, generate aggregated response packets, and introduce the aggregated response back into the data plane for transmission "backward" up the multicast distribution tree to the source. According to some implementations, the control plane functionalities described herein may be implemented using existing control plane resources, e.g., the CPU handling conventional control plane functions. Alternatively, the control plane functions associated with collect primitives may be implemented in separate dedicated circuitry (e.g., an FPGA, a PLD, an ASIC, a microcontroller or CPU), or even in software. According to a specific class of embodiments, the control plane logic is implemented in a device (e.g., an FPGA or the like) which sits between the conventional control plane logic (e.g., the control plane CPU) and the switch chip. This control plane logic "spoofs" the control plane CPU interface, passing along communications unrelated to the collect primitive to the CPU, and intercepting communications related to the collect primitive. In this way, the functionality embodied by the collect primitive described herein may be transparently introduced in existing switch fabric infrastructures. And, as should be readily understood by those of skill in the art, the collect primitive described herein may be implemented in switch fabrics having arbitrary topologies (as represented by the switches 510 and hosts 512 connected to switch 502). Therefore, the invention should not be limited to any particular switch fabric topology.

While the invention has been particularly shown and described with reference to specific embodiments thereof, it will be understood by those skilled in the art that changes in the form and details of the disclosed embodiments may be made without departing from the spirit or scope of the invention. For example, the functionalities described herein may be implemented in a wide variety of contexts using a wide variety of technologies without departing from the scope of the invention. That is, embodiments of the invention may be implemented in processes and circuits which, in turn, may be represented (without limitation) in software (object code or machine code), in varying stages of compilation, as one or more netlists, in a simulation language, in a hardware description language, by a set of semiconductor processing masks, and as partially or completely realized semiconductor devices. The various alternatives for each of the foregoing as understood by those of skill in the art are also within the scope of the invention. For example, the various types of computer-readable media, software languages (e.g., Verilog, VHDL), simulatable representations (e.g., SPICE netlist), semiconductor processes (e.g., CMOS, GaAs, SiGe, etc.), and device types (e.g., frame switches) suitable for designing and manufacturing the processes and circuits described herein are within the scope of the invention.

Embodiments of the invention are described herein with reference to frame or frame switching devices. According to such embodiments and as described above, some or all of the functionalities described may be implemented in the hardware of highly-integrated semiconductor devices, e.g., 1-Gigabit and 10-Gigabit Ethernet switches, various switch system switches, and similar devices.

In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:
1. A switch device comprising:
a plurality of ports to couple the switch device to a plurality of host devices, the switch device other than any host device, wherein the plurality of host devices are interconnected with one another via a switch fabric including a plurality of switch devices comprising the switch device, the plurality of ports configured to receive and transmit data packets; and
switch logic configured to facilitate transfer of the data packets among the plurality of ports, the switch logic further being configured to identify a multicast request of a first data packet received by the switch device from a source host device, to forward the first data packet to multiple destination host devices, to intercept and collect response data packets from the multiple destination host devices, the response data packets each addressed to the source host device, the response data packets each including:
a respective response to the multicast request; and
a respective header indicating a collect primitive;
the switch logic further to aggregate the respective responses of the response data packets to the multicast request to generate an aggregated response data packet with the collect primitive, wherein a first portion of the switch logic is configured to identify, count, and discard the response data packets in a data plane of the switch device, and wherein a second portion of the switch logic is configured to generate the aggregated response data packet in a control plane of the switch device and introduce the aggregated response data packet into the data plane when a sufficient number of the respective responses of the response data packets has been received, wherein the first portion of the switch logic is configured to identify the respective responses of the response data packets with reference to an access control list corresponding to the collect primitive, wherein the aggregated response data packet is transmitted from the switch device toward the source host device.

2. The switch device of claim 1 wherein the second portion of the switch logic is configured to generate the aggregated response data packet by performing a logical combination of at least some of the respective responses of the response data packets.

3. The switch device of claim 1 wherein the second portion of the switch logic is configured to generate the aggregated response data packet by selecting from among at least some of the respective responses of the response data packets.

4. The switch device of claim 1 wherein the respective responses of the response data packets are responsive to a request from the source host device to determine whether any of the destination host devices corresponds to a particular state, and wherein the second portion of the switch logic is configured to generate the aggregated response data packet by forwarding only one of the respective responses of the response data packets corresponding to the particular state.

5. The switch device of claim 1, further comprising a ternary content addressable memory ("TCAM") coupled to the data plane to monitor for the respective responses of the response data packets to the multicast request and wherein the switch logic is coupled to the TCAM to update a counter that counts a number of the respective responses of the response data packets received in response to the multicast request, wherein the switch logic is coupled to reset the counter upon receiving all of the respective responses of the response data packets to the multicast request.

6. The switch device of claim 1, wherein the multicast request targets the multiple destination host devices with a group address for a group comprising only host devices.

7. A switch fabric configured to interconnect a plurality of host devices, the switch fabric comprising:
a plurality of interconnected switch devices including a first switch device comprising:
a plurality of ports to couple the first switch device to a plurality of host devices, the first switch device other than any host device, wherein the plurality of host devices are interconnected with one another via the switch fabric, the plurality of ports configured to receive and transmit respective data packets; and
switch logic configured to facilitate transfer of the respective data packets among the plurality of ports, the switch logic further being configured to identify a multicast request of a first data packet received by the first switch device from a source host device, to forward the first data packet to multiple destination host devices, to intercept and collect response data packets from the multiple destination host devices, the response data packets each addressed to the source host device, the response data packets each including:
a respective response to the multicast request; and
a respective header indicating a collect primitive;
the switch logic further to aggregate the respective responses of the response data packets to the multicast request to generate an aggregated response data packet with the collect primitive, wherein a first portion of the switch logic is configured to identify, count, and discard the response data packets in a data plane of the first switch device, and wherein a second portion of the switch logic is configured to generate the aggregated response data packet in a control plane of the first switch device and introduce the aggregated response data packet into the data plane when a sufficient number of the respective responses of the response data packets has been received, wherein the first portion of the switch logic is configured to identify the respective responses of the response data packets with reference to an access control list corresponding to the collect primitive, wherein the aggregated response data packet is transmitted from the first switch device toward the source host device.

8. The switch fabric of claim 7 wherein the switch devices are interconnected in a topology in which address learning is enabled and that is loop free.

9. The switch fabric of claim 7, wherein the first switch device further comprises a ternary content addressable memory ("TCAM") coupled to the data plane to monitor for the respective responses of the response data packets to the multicast request and wherein the switch logic is coupled to the TCAM to update a counter that counts a number of the respective responses of the response data packets received in response to the multicast request, wherein the switch logic is coupled to reset the counter upon receiving all of the respective responses of the response data packets of the multicast request.

* * * * *